United States Patent [19]

Kobayashi

[11] Patent Number: 5,192,250
[45] Date of Patent: Mar. 9, 1993

[54] MULTIPLE SPROCKET ASSEMBLY FOR BICYCLE

[75] Inventor: Jun Kobayashi, Osaka, Japan

[73] Assignee: Maeda Industries, Ltd., Osaka, Japan

[21] Appl. No.: 848,044

[22] Filed: Mar. 9, 1992

[30] Foreign Application Priority Data

Apr. 23, 1991 [JP] Japan .................................. 3-122372

[51] Int. Cl.⁵ ............................................. F16H 55/30
[52] U.S. Cl. ..................................... 474/162; 474/160
[58] Field of Search ......... 474/160, 162, 164, 152-157

[56] References Cited

U.S. PATENT DOCUMENTS

| 4,268,259 | 5/1981 | Segawa et al. | 474/160 |
| 4,592,738 | 6/1986 | Nagano | 474/162 X |
| 5,087,226 | 2/1992 | Nagano | 474/160 |
| 5,133,695 | 7/1992 | Kobayashi | 474/160 |

FOREIGN PATENT DOCUMENTS

| 0021839 | 7/1981 | European Pat. Off. |
| 0417696 | 3/1991 | European Pat. Off. |
| 0429007 | 5/1991 | European Pat. Off. |
| 64-40791 | 3/1989 | Japan |

Primary Examiner—Thuy M. Bui
Attorney, Agent, or Firm—Marks & Murase

[57] ABSTRACT

A bicycle multiple sprocket assembly comprises smaller and larger sprockets for shiftable engagement with a chain. The larger sprocket includes at least one reluctantly disengageable tooth, at least one chain supporting tooth immediately following the reluctantly disengageable tooth with respect to the forward rotational direction of the sprocket assembly, and at least one easily disengageable tooth immediately following the chain supporting teeth. The apex of the chain supporting tooth is wider than those of the other larger sprocket teeth for supporting thereon the chain at the time of shifting from the larger to smaller sprockets.

12 Claims, 6 Drawing Sheets

MULTIPLE SPROCKET ASSEMBLY FOR BICYCLE

BACKGROUND OF THE INVENTION

1. Field of the Invention

This invention relates to a bicycle multiple sprocket assembly having at least two diametrically different sprockets. More specifically, the invention relates to a multiple sprocket assembly which is designed to provide smooth chain shifting from a larger sprocket to a smaller sprocket.

The term "multiple sprocket assembly" as used herein includes a multiple chainwheel (front gear) which is mounted on a pedal crank assembly, and a multiple freewheel (rear gear) mounted on a rear wheel hub.

2. Description of the Prior Art

Many of currently available bicycles not only have a multiple freewheel to constitute a rear gear mounted on a rear wheel hub, but also incorporate a multiple chainwheel to constitute a front gear mounted on a pedal crank, thereby increasing the number of selectable speeds. A selected sprocket of the front gear is connected to a selected sprocket of the rear gear by an endless chain, and the pedalling force applied to the front gear is transmitted through the chain to the rear gear for driving the bicycle forward.

With a multiple sprocket assembly, a speed change is performed by causing a derailleur (front derailleur or rear derailleur) to laterally press a portion of the chain entering to the sprocket assembly in rotation, which results in that the chain is laterally inclined for shifting from a smaller sprocket to a larger sprocket or vice versa. Obviously, the speed change performance of the sprocket assembly is determined by the smoothness and promptness in disengaging the chain from a presently engaging sprocket for engagement with a target sprocket.

In shifting the chain from a larger sprocket to a smaller sprocket, the chain need only be disengaged from the larger sprocket because a tension applied to the chain can be utilized for causing the chain to automatically fall into engagement with the smaller sprocket. For this reason, it has been hitherto considered easier to shift the chain from the larger sprocket to the smaller sprocket than to shift it from the smaller sprocket to the larger sprocket. Therefore, not much effort has been made to improve chain shiftability from the larger sprocket to the smaller sprocket.

In reality, however, each sprocket of a multiple sprocket assembly has a different number of teeth. Thus, the chain disengaging from the larger sprocket is not necessarily positioned suitably relative to the teeth of the smaller sprocket. In some cases, the chain (chain rollers) may ride on the teeth apexes of the smaller sprocket and move idly through a small angle before completely coming into driving engagement with it. As a result, a large drive force is abruptly applied to the smaller sprocket and the chain, thereby damaging these components. Further, the rider feels a considerable shock at the time of this phenomenon, which sometimes causes danger to the rider.

In view of the above problem, Japanese Utility Model Application Laid-open No. 64-40791 discloses an improved multiple sprocket assembly which is designed so that the chain is made to start shifting from a larger sprocket to a smaller sprocket at a selected angular position of the sprocket assembly. Further, the relative angular position of the smaller and larger sprockets is suitably adjusted so that the chain engages the smaller sprocket without idle movement when the chain starts disengaging at the selected position.

Specifically, the larger sprocket of the above Japanese application comprises an easily disengageable tooth (or a plurality of such teeth) to insure that the chain starts disengaging at this tooth (corresponding to the selected angular position). Further, the smaller and larger sprockets are angularly adjusted so that a tangential line drawn from the furrow center immediately following the easily disengageable tooth to a furrow center of the smaller sprocket has a length which is slightly smaller than np (n: integer number; p: chain pitch). Thus, the chain disengaging from the larger sprocket at the easily disengageable tooth can come immediately into driving engagement with the smaller sprocket teeth without idle movement.

However, the multiple sprocket assembly of the Japanese application is still disadvantageous in the following points.

First, when the chain disengages from the larger sprocket at the easily disengageable tooth, the disengaging chain interferes laterally with the easily disengageable tooth and another tooth immediately following the easily disengageable tooth. Such lateral interference causes the disengaging chain to be laterally inclined or bent to an excessive degree under the tension applied to the chain. Thus, the chain and the larger sprocket are mechanically damaged by repetitive shifting of the chain from the larger sprocket to the smaller sprocket, consequently shortening the life of these components.

Secondly, excessive lateral inclination of the disengaging chain causes it to skip the smaller sprocket, thereby failing to perform intended chain shifting. This problem becomes particularly pronounced when the axial spacing between the smaller and larger sprockets is relatively small.

SUMMARY OF THE INVENTION

It is, therefore, an object of the present invention to provide a bicycle multiple sprocket assembly which provides smooth chain shifting from a larger sprocket to a smaller sprocket without causing excessive lateral inclination or bending of the shifting chain, thereby insuring reliable chain shifting and prolonging the life of the sprocket assembly.

According to the present invention, there is provided a bicycle multiple sprocket assembly comprising at least two adjacent sprockets which include a diametrically smaller sprocket and a diametrically larger sprocket, each sprocket having teeth alternate with furrows for engagement with a chain, each tooth having an apex, each furrow having a bottom; wherein the teeth of the larger sprocket includes at least one reluctantly disengageable tooth, at least one chain supporting tooth immediately following the reluctantly disengageable tooth with respect to a forward rotational direction of the sprocket assembly, and at least one easily disengageable tooth immediately following the chain supporting tooth with respect to the forward rotational direction, and wherein the apex of the chain supporting tooth supports the chain at the time of shifting from the larger to smaller sprockets.

The present invention starts from the knowledge that it is impossible to avoid chain-tooth interference at a portion where the chain starts disengaging from the larger sprocket because the chain is still in driving engagement immediately ahead of the disengagement starting portion. Then, the next choice is to minimize chain-tooth interference in the lateral direction, thereby preventing the disengaging chain from being laterally inclined to a larger degree than is provided by the derailleur.

Based on this idea, the present invention proposes that the disengaging chain be rested directly on the apex of the chain supporting tooth itself, so that the direction of chain-tooth interference is radial rather than lateral. Thus, the disengaging chain is inclined only by the lateral movement of the derailleur but not by the chain-tooth interference, thereby enabling to perform intended chain shifting from the larger to smaller sprockets.

Other objects, features and advantages of the present invention will be clearly understood from the following description of the preferred embodiments given with reference to the accompanying drawings.

BRIEF DESCRIPTION OF TUE DRAWINGS

DETAILED DESCRIPTION OF THE PREFERRED EMBODIMENTS

Referring to FIGS. 1 through 7, there is illustrated a multiple freewheel (rear gear) 1 to which the present invention is applied. However, the present invention is equally applicable to a multiple chainwheel (front gear).

Figure 1:
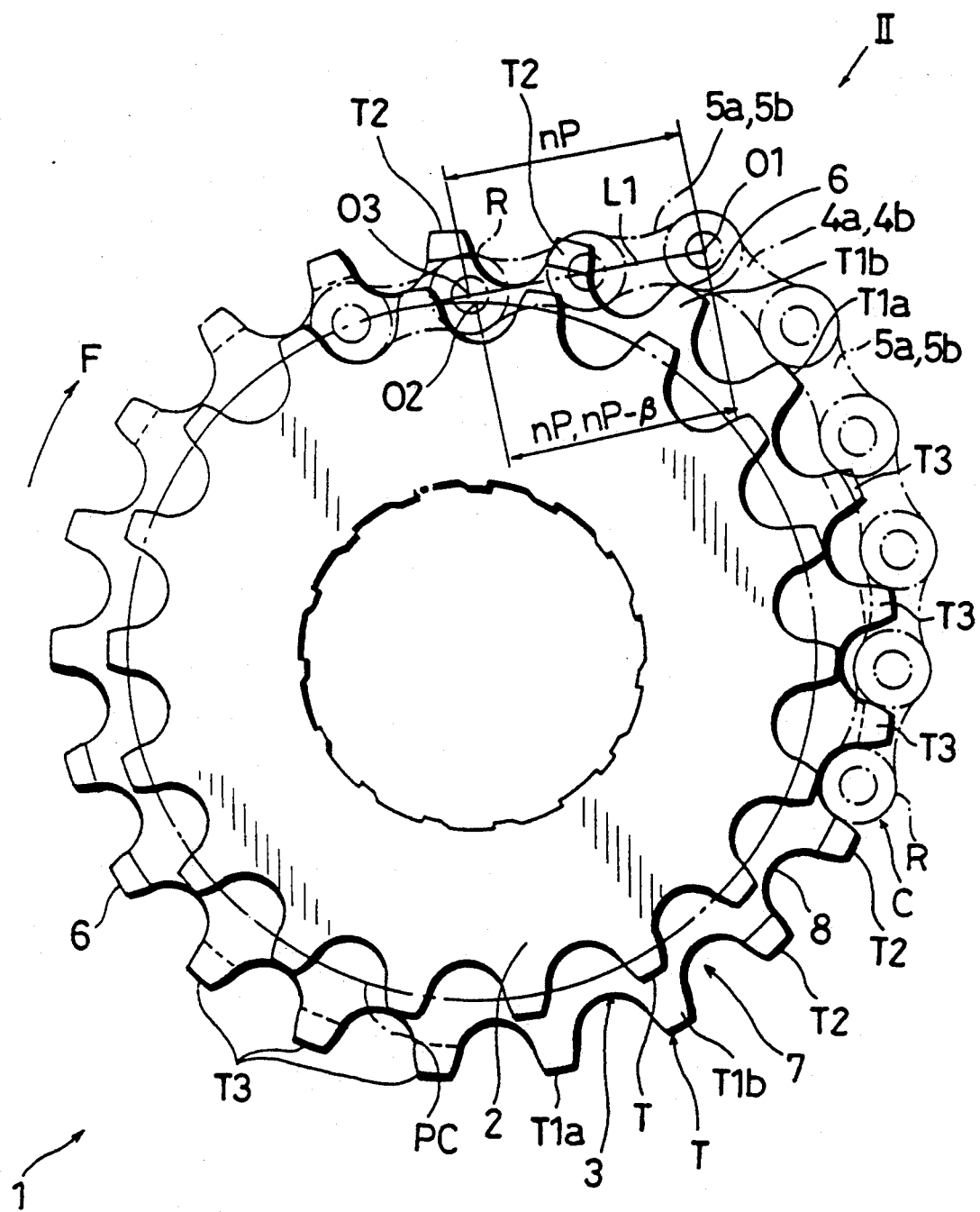
FIG. 1 is a side view showing a multiple sprocket assembly embodying the present invention.

For simplicity of illustration, the multiple freewheel 1 is shown in FIG. 1 to include a diametrically smaller sprocket 2, and a diametrically larger sprocket 3 arranged laterally of the larger sprocket adjacent thereto. In reality, however, the freewheel of the illustrated embodiment includes a larger number (usually 5 to 8) of diametrically different sprockets, and the present invention is applicable to any two adjacent sprockets of the assembly.

The circumference of each sprocket 2, 3 is formed with teeth T (including specific teeth T1a, T1b, T2, T3 to be described later) arranged at constant pitch which corresponds to the pitch of a chain C. Each tooth T has an apex 6. Furrows 7 are formed between the respective teeth T, and each furrow has a generally arcuate bottom 8.

Figure 2:
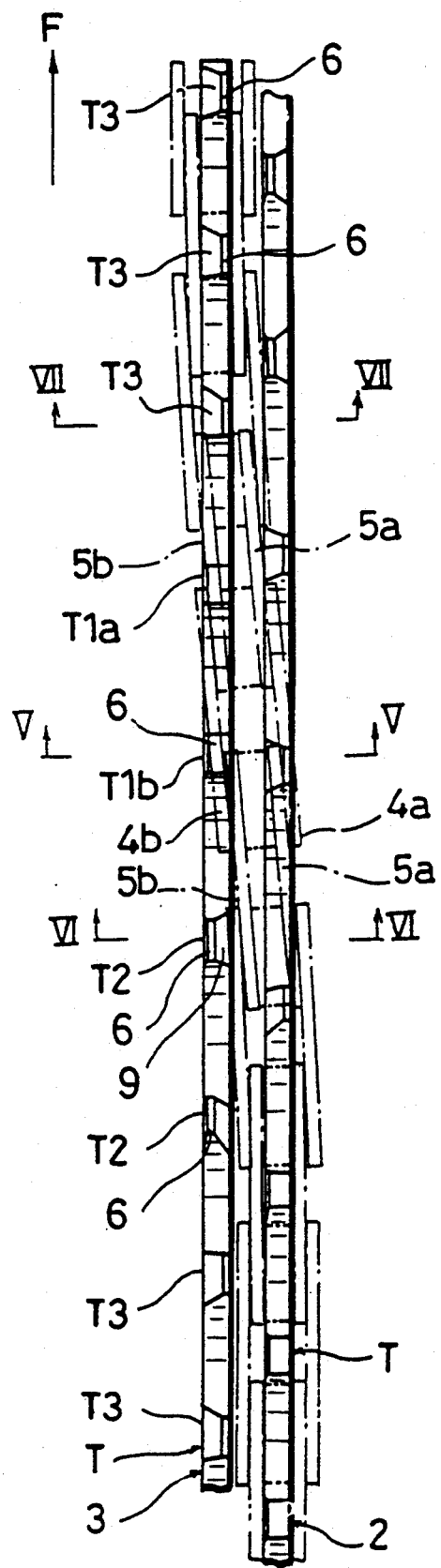
FIG. 2 is a view of the same sprocket assembly in a first chain shifting condition as seen in the direction of an arrow II in FIG. 1.

As shown in FIGS. 1 and 2, the chain C includes pairs of outer links 4a, 4b and pairs of inner links 5a, 5b alternate with the outer link pairs. The inner link pairs 5a, 5b are connected to the outer link pairs 4a, 4b by pin rollers R. The rollers R are slightly smaller in curvature than the sprocket furrow bottoms 8. Thus, each sprocket 2, 3 engages with the chain C in a manner such that each chain roller R is received in a furrow 7 between two adjacent sprocket teeth T with a slight play or backlash.

According to the illustrated embodiment, the teeth T of the larger sprocket 3 include three kinds of teeth. A first kind includes three circumferentially spaced groups of chain supporting teeth T1a, T1b (two in each group according to the illustrated embodiment) which are adjacent to each other. A second kind includes two easily disengageable teeth T2 immediately following each group of chain supporting teeth T1a, T1b with respect to the forward rotational direction (arrow F direction in FIG. 1) of the sprocket assembly 1. A third kind includes reluctantly disengageable teeth T3 constituting the remainder of the larger sprocket teeth.

Figure 5:
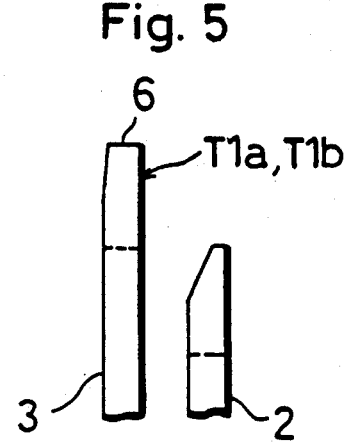
FIG. 5 is a sectional view taken on lines V—V in FIG. 2.

As shown in FIG. 5, the apex 6 of each chain supporting tooth T1a, T1b is rendered wider than those of any other larger sprocket teeth. In the illustrated embodiment, the width of the chain supporting tooth apex is generally equal to the thickness of the larger sprocket 3. Thus, the chain C can be stably supported on the chain supporting tooth apex at the time of disengaging from the larger sprocket, as described below.

Figure 6:
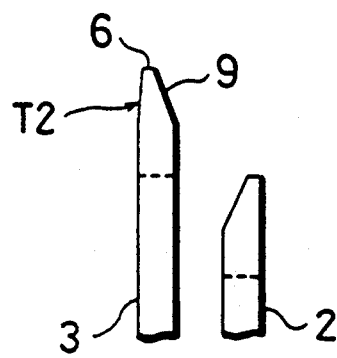
FIG. 6 is a sectional view taken on lines VI—VI in FIG. 2.

As shown in FIG. 6, the apex 6 of each easily disengageable tooth T2 is rendered offset away from the smaller sprocket 2 by forming a chamfer face 9 at that apex portion on the side closer to the smaller sprocket. Thus, the chain C is more likely to disengage at the easily disengageable tooth T2. Further, the chamfer face 9 of the easily disengageable tooth T2 works to provisionally support the disengaging chain, as described hereinafter.

Figure 7:
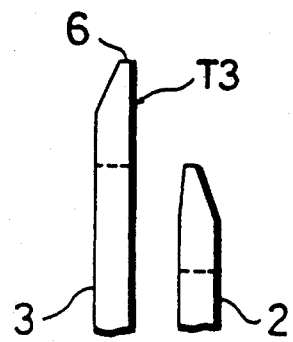
FIG. 7 is a sectional view take on lines VII—VII in FIG. 2.

As shown in FIG. 7, the apex 6 of each reluctantly disengageable tooth T3 is rendered offset toward the smaller sprocket 2 by chamfering that tooth apex portion on the side thereof away from the smaller sprocket. Obviously, due to such an offset, the chain C engaging the larger sprocket 3 is less likely to disengage at the reluctantly disengageable tooth T3.

In operation for shifting the chain C from the larger sprocket 3 to the smaller sprocket 2, the chain C engaging the larger sprocket 3 is laterally pressed toward the smaller sprocket 2 by the chain guide of an unillustrated rear derailleur. However, since the reluctantly disengageable teeth T3 are made offset toward the smaller sprocket 2, the chain C does not start disengaging at the reluctantly disengageable teeth T3 in spite of lateral pressing. Thus, the chain C starts disengaging only when it reaches a circumferential region of the larger sprocket 3 where the chain supporting teeth T1a, T1b and easily disengageable teeth T2 are located.

As already described, the chain C comprises alternate pairs of outer links 4a, 4b and inner links 5a, 5b. Obviously, the spacing between the outer link pair is larger than that between the inner link pair. Thus, disengagement of the chain C from the larger sprocket 3 occurs in the following two different modes. For convenience of the following explanation, the chain supporting tooth T1a immediately following the reluctantly disengageable teeth T3 with respect to the forward rotational direction F (see FIG. 1) is referred to as "first chain supporting tooth", whereas the other chain supporting tooth T1b is referred to as "second chain supporting tooth". Further, one link 4b or 5b of each link pair 4a, 4b or 5a, 5b, which is located laterally farther from the smaller sprocket 2, is referred to as "farther link".

In the first shifting mode shown in FIGS. 1 and 2, when an inner link pair 5a, 5b coincides with the first chain supporting tooth T1a, the farther link 5b of the inner link pair rides over the first chain supporting tooth T1a and is stably supported on the wide apex 6 of that tooth. Similarly, the farther link 4b of the next outer link pair 4a, 4b rides over the second chain supporting tooth T1b and is stably supported on the wide apex 6 of that tooth. In this shifting mode, the inclined disengaging chain C does not interfere with the easily disengageable tooth T2 immediately following the second chain supporting tooth T1b because the apex 6 of the easily disengageable tooth T2 is offset away from the smaller sprocket 2.

Figure 3:
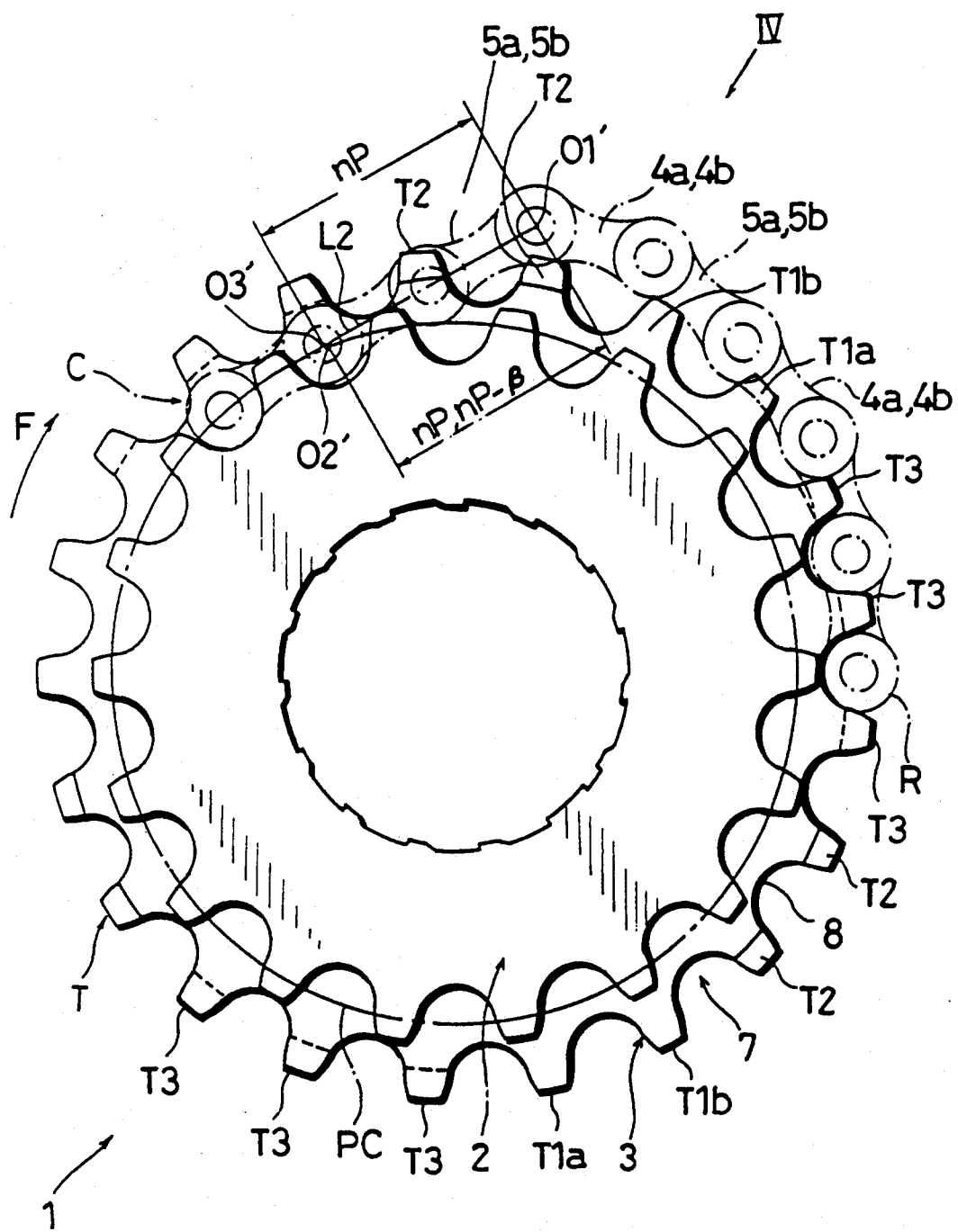
FIG. 3 is a side view similar to FIG. 1 but showing the same sprocket assembly in a second chain shifting condition.
Figure 4:
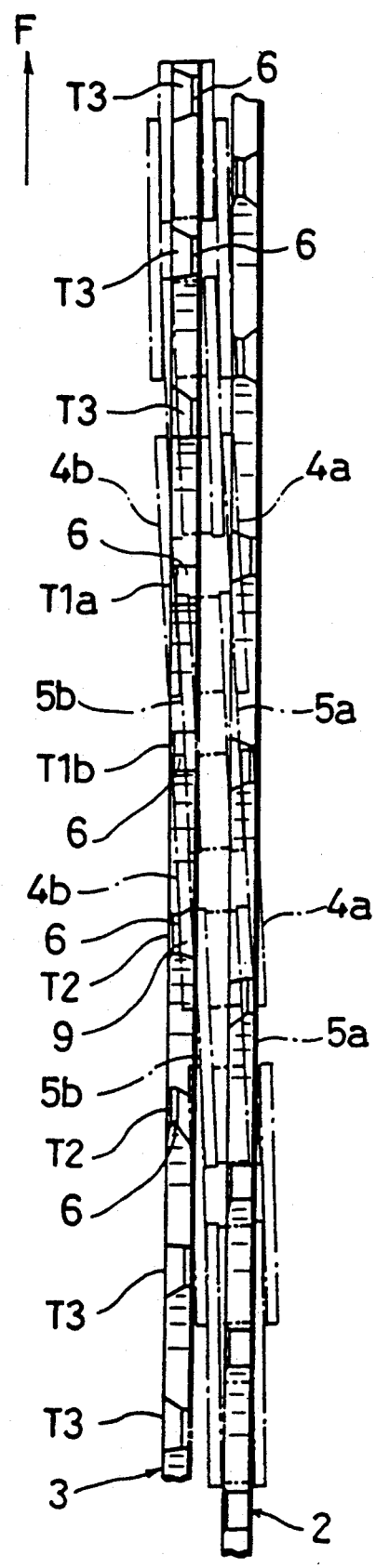
FIG. 4 is a view similar to FIG. 1 but showing the same sprocket assembly in the second chain shifting condition.

In the second shifting mode shown in FIGS. 3 and 4, on the other hand, when an outer link pair 4a, 4b coincides with the first chain supporting tooth T1a, the respective links 4a, 4b of the outer link pair are still located on both sides of the first chain supporting tooth T1a due to the relatively large spacing between the respective links. However, the farther link 5b of the next inner link pair 5a, 5b rides over the second chain supporting tooth T1b and is stably supported on the wide apex 6 of that tooth. Moreover, the farther link 4b of the next outer link pair 4a, 4b rides over the next easily disengageable tooth T2 and is stably supported by the chamfer face 9 of that tooth.

Upon further forward rotation of the sprocket assembly 1, the chain C is pulled straight under a tension applied thereto by the unillustrated derailleur and extends substantially tangentially toward the circumference of the smaller sprocket 2 (see FIGS. 1 and 3). At this time, the easily disengageable tooth T2 immediately following the second chain supporting tooth T1b does not laterally press the thus disengaging chain C because it clears the chain (FIGS. 1 and 2) or radially supports the chain (FIGS. 3 and 4). Thus, the chain C is prevented from being laterally bent or inclined to an excessive degree in shifting to the smaller sprocket 2.

According to the prior art, on the other hand, the chain disengaging from a larger sprocket along a tangential path interferes with the larger sprocket teeth and is therefore bent or inclined to an excessive degree. As a result, the chain may skip the smaller sprocket to fail in shifting from the larger sprocket to the smaller sprocket. Further, undue bending of the chain and objectionable interference thereof with the larger sprocket may result in damage of the chain and/or larger sprocket, consequently shortening the life of these components.

The present invention eliminates or reduces the above problems of the prior art by positively causing the chain C to be lifted and stably supported by the chain supporting teeth T1a, T1b (and additionally by the chamfer face 9 of the next easily disengageable tooth T2) before transition to the smaller sprocket 2. As a result, the chain shiftability from the larger sprocket 3 to the smaller sprocket 2 is greatly improved, and the life of the chain C and larger sprocket 3 can be increased by decreasing the degree of chain bending or inclination.

In FIG. 1, a substantially tangential line L1 is drawn from the rear connection center 01 of the outer link pair 4a, 4b, which is supported by the second chain supporting tooth T1b, to a furrow center 02 of the smaller sprocket 2. Preferably, the length of the tangential line L1 is set equal to np or np-β, where:

p represents the pitch of the chain C,
n represents an integer number, and
β represents a value which is smaller than half the width of each furrow 7 at the pitch circle PC of the smaller sprocket.

As clearly shown in FIG. 2, the chain C is slightly inclined laterally in shifting from the larger sprocket 3 to the smaller sprocket 2 because these two sprockets are not in the same plane. Thus, by properly adjusting β in np-β, it is possible to make a link connection center 03 of the chain C coincide exactly with the furrow center 02 of the smaller sprocket 2. However, because the lateral inclination of the chain C is relatively small and because the chain roller R is slightly smaller in curvature than the furrow bottom 8, a particular roller R providing the connection center 03 may be properly received in a particular furrow 7 providing the furrow center 02 even if the length of the tangential line L1 is equal to np. In this way, it is possible to avoid a situation in which the chain C moves idly relative to the smaller sprocket 2 before completely coming into driving engagement therewith.

In the illustrated embodiment, the larger sprocket 3 is shown to have three groups of first and second chain supporting teeth T1a, T1b. Thus, the chain C may start disengaging at any of the three groups, and three similar tangential lines L1 may be drawn. However, these three tangential lines L1 are not necessarily equal in length because the teeth positional relation between the smaller and larger sprockets 2, 3 differ angularly.

To more specifically explain this, it is now assumed that the smaller sprocket 2 has twenty seven (27) teeth while the larger sprocket 3 has thirty (30) teeth. In this case, the greatest common divisor for the larger sprocket teeth number and the smaller sprocket teeth number is three (3), and the teeth positional relation between the smaller and larger sprockets 2, 3 returns to the same condition at every 120° (every nine teeth for the smaller sprocket 2 and every ten teeth for the larger sprocket 3). Thus, the three tangential lines L may be rendered equal in length in this case.

On the other hand, if the smaller sprocket 2 has twenty seven (27) teeth while the larger sprocket 3 has thirty one (31) teeth, there is no common divisor other than unity (1) for the respective teeth numbers of the smaller and larger sprockets 2, 3. Thus, the three tangential lines L1 differ slightly in length from each other. Indeed, a similar situation also occurs with respect to any combination of two diametrically different sprockets wherein there is no common divisor other than unity for the respective teeth numbers of the two sprockets.

Even in the latter case described above, the difference in length of the respective tangential lines L1 can be kept smaller than half the pitch circle width of each tooth furrow 7. In other words, the length of the respective tangential lines L1 may be set either np or np-β, so that the chain C may be made to disengage smoothly at the respective angular positions of the sprocket assembly 1.

In FIG. 3, another substantially tangential line L2 is drawn from the rear connection center 01' of the outer link pair 4a, 4b, which is supported by the easily disengageable tooth T2 immediately the second chain supporting tooth T1b, to a furrow center 02' of the smaller sprocket 2. Again, the length of the tangential line L2 is preferably set equal to np or np-β (as hereinbefore defined). Such setting enables that a link connection center 03' of the chain C exactly or roughly coincides with the furrow center 02' of the smaller sprocket 2, so that no idle movement of the chain C relative to the smaller sprocket and no abrupt drive force transmission thereto occur at the time of shifting from the larger to smaller sprockets.

In the illustrated embodiment, the two kinds of tangential lines L1, L2 are set equal to np or np-β. To realize this, the height of each chain supporting tooth T1a, T1b and/or the inclination of the chamfer face 9 of each easily disengageable tooth T2 may be suitably adjusted.

The multiple sprocket assembly according to the present invention may be modified in various ways. For instance, each easily disengageable tooth T2 may be made to have a chain supporting step (not shown) instead of the chain supporting chamfer face 9.

Further, the entirety of each easily disengageable tooth T2 may be rendered offset away from the smaller sprocket 2. In this case, the easily disengageable tooth T2 has no chain supporting function, and the disengaging chain C is supported only by one or both of the chain supporting teeth T1a, T1b.

Moreover, the larger sprocket 3 may be made to include normal teeth in addition to the specific teeth T1a, T1b, T2, T3 described above.

Figure 8:
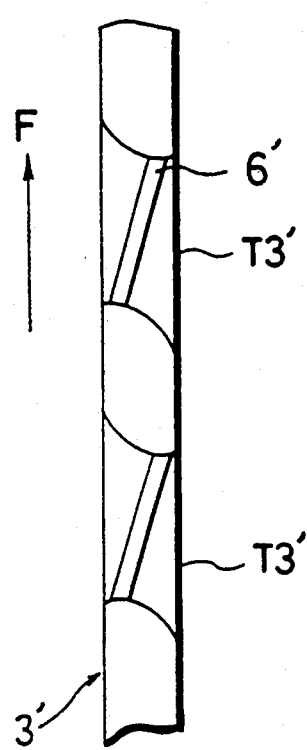
FIG. 8 is a fragmentary view showing a modified larger sprocket embodying the present invention.

FIG. 8 shows another example of larger sprocket 3' which has modified reluctantly disengageable teeth T3'. Specifically, each modified reluctantly disengageable tooth T3' has an apex 6' which is inclined relative to a plane containing the larger sprocket in a manner such that the apex 6' becomes closer to the smaller sprocket (not shown in FIG. 8) as it extends in the forward rotational direction F.

Figure 9:
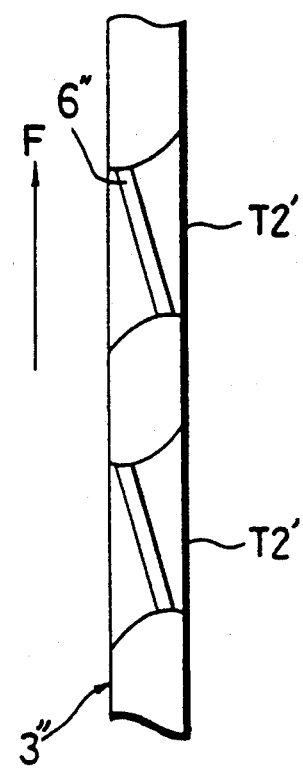
FIG. 9 and 10 are fragmentary views showing other modified larger sprocket embodying the present invention.

FIG. 9 shows still another example of larger sprocket 3" which has modified easily disengageable teeth T2'. Specifically, each modified easily disengageable tooth T2' has an apex 6" which is inclined relative to a plane containing the larger sprocket in a manner such that the apex 6" becomes farther from the smaller sprocket (not shown in FIG. 9) as it extends in the forward rotational direction F.

Figure 10:
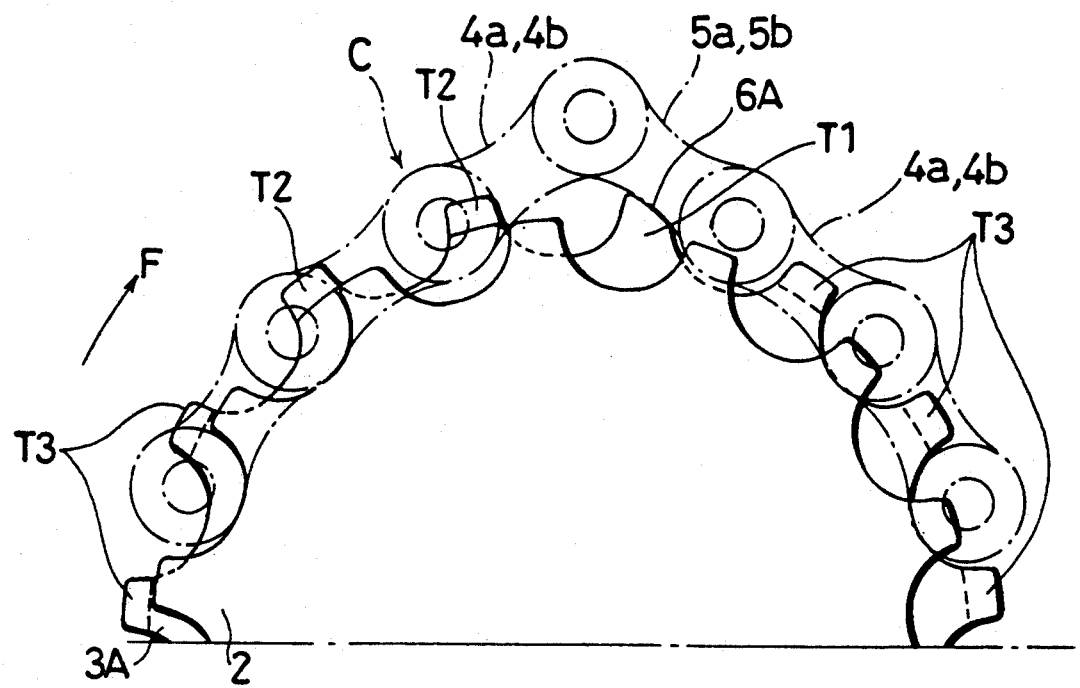

FIG. 10 shows a further example of larger sprocket 3A which has a single modified chain supporting tooth T1 immediately preceded by reluctantly disengageable teeth T3 and immediately followed by easily disengageable teeth T2. The modified chain supporting tooth T1 has a chain supporting apex A which is sloped forwardly downward, so that the height of the chain supporting tooth T1 decreases in the forward rotational direction F.

In the example of FIG. 10, the chain C can be supported on the apex 6A of the chain supporting tooth T1 without unduly lifting the chain at the reluctantly disengageable teeth T3. Thus, the chain can be shifted more smoothly and quickly from the larger sprocket 3A to the smaller sprocket 2.

Preferably, the apex 6A of the chain supporting tooth T1 is made to conform to the inner edge of the chain link supported thereon at the time of chain shifting. Such a configuration insures very stable support for the disengaging chain.

The present invention being thus described, it is obvious that the same may be varied in many ways. For instance, the larger sprocket need only to include at least one reluctantly disengageable tooth, at least one chain supporting tooth following the reluctantly disengageable tooth, and at least one easily disengageable tooth following the chain supporting tooth. Such variations are not to be regarded as a departure from the spirit and scope of the invention, and all such modifications as would be obvious to those skilled in the art are intended to be included within the scope of the following claims.

I claim:

1. A bicycle multiple sprocket assembly comprising at least two adjacent sprockets which include a diametrically smaller sprocket and a diametrically larger sprocket, each sprocket having teeth alternate with furrows for engagement with a chain, each tooth having an apex, each furrow having a bottom;

wherein the teeth of the larger sprocket includes at least one reluctantly disengageable tooth, at least one chain supporting tooth immediately following the reluctantly disengageable tooth with respect to a forward rotational direction of the sprocket assembly, and at least one easily disengageable tooth immediately following the chain supporting tooth with respect to the forward rotational direction, and wherein the apex of the chain supporting tooth supports the chain at the time of shifting from the larger to smaller sprockets.

2. The sprocket assembly according to claim 1, wherein the apex of the chain supporting tooth is wider than those of the other larger sprocket teeth.

3. The sprocket assembly according to claim 2, wherein the apex of the chain supporting tooth has a width generally equal to the thickness of the larger sprocket.

4. The sprocket assembly according to claim 1, wherein the chain has a link connection center raised above the apex of the chain supporting tooth at the time of shifting from the larger sprocket to the smaller sprocket, the chain taking a substantially tangential shifting path extending from said link connection center toward a furrow center of the smaller sprocket, the chain shifting path having a length which is equal to np or np-β, where p represents pitch of the chain, n represents an integer number, and β represents a value which is smaller than half the width of the furrow at the pitch circle of the smaller sprocket.

5. The sprocket assembly according to claim 1, wherein the apex of the reluctantly disengageable tooth is rendered offset toward the smaller sprocket.

6. The sprocket assembly according to claim 1, wherein the apex of the reluctantly disengageable tooth is inclined relative to a plane containing the larger sprocket to be closer to the smaller sprocket as the apex extends in the forward rotational direction.

7. The sprocket assembly according to claim 1, wherein the apex of the easily disengageable tooth is rendered offset away from the smaller sprocket.

8. The sprocket assembly according to claim 7, wherein the easily disengageable tooth has a chain supporting portion on the side of its apex closer to the smaller sprocket, the chain supporting portion supports a radially inner edge of the chain at a position radially inwardly of the apex of the easily disengageable tooth but radially outwardly of the furrow bottom of the larger sprocket.

9. The sprocket assembly according to claim 8, wherein the chain supporting portion of the easily disengageable tooth is an inclined chain supporting face which is formed by chamfering a tooth apex portion of the easily disengageable tooth on the side thereof closer to the smaller sprocket.

10. The sprocket assembly according to claim 8, wherein the chain has a link connection center raised above the chain supporting portion of the easily disengageable tooth at the time of shifting from the larger sprocket to the smaller sprocket, the chain taking a substantially tangential shifting path extending from said link connection center toward a furrow center of the smaller sprocket, the chain shifting path having a length which is equal to np or np-β, where
    p represents pitch of the chain,
    n represents an integer number, and
    β represents a value which is smaller than half the width of the furrow at the pitch circle of the smaller sprocket.

11. The sprocket assembly according to claim wherein the apex of the easily disengageable tooth is inclined relative to a plane containing the larger sprocket to be farther from the smaller sprocket as the apex extends in the forward rotational direction.

12. The sprocket assembly according to claim 1, wherein the apex of the chain supporting tooth is sloped in a manner such that the height of the chain supporting tooth decreases as the sloped apex extends in the forward rotational direction.

* * * * *